US006387468B1

(12) United States Patent
Kim et al.

(10) Patent No.: US 6,387,468 B1
(45) Date of Patent: May 14, 2002

(54) ORNAMENTAL STEEL AND MANUFACTURING METHOD THEREFOR

(75) Inventors: Jae Hyun Kim; In Suk Cha, both of Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 09/209,824

(22) Filed: Dec. 11, 1998

(30) Foreign Application Priority Data

Dec. 13, 1997 (KR) .......................................... 97/68546
Dec. 13, 1997 (KR) .......................................... 97/68547

(51) Int. Cl.$^7$ .......................... B32B 1/04; A47G 35/00
(52) U.S. Cl. ...................... 428/67; 428/66.5; 428/168; 428/172; 428/173; 428/187; 428/207; 428/209; 428/542.2; 428/913.3
(58) Field of Search ............................... 428/172, 195, 428/207, 167, 168, 173, 187, 209, 542.2, 601, 614, 66.5, 67, 913.3, 542.6; 156/60; 216/100

(56) References Cited

U.S. PATENT DOCUMENTS 374,559 A * 12/1887 Rudolph .................... 428/187
2,001,725 A * 5/1935 Harris ........................ 428/67
2,019,951 A * 11/1935 Caprio ...................... 428/187
2,558,791 A * 7/1951 Smith et al. ............... 428/187
4,767,647 A * 8/1988 Bree .......................... 428/67
5,587,218 A * 12/1996 Betz .......................... 428/67

* cited by examiner

*Primary Examiner*—Donald J. Loney
(74) *Attorney, Agent, or Firm*—Birch, Stewart, Kolasch & Birch, LLP

(57) ABSTRACT

An ornamental steel plate and a manufacturing method therefor wherein the ornamental steel plate includes a steel plate, a pattern forming groove being formed on the surface of which according to a pattern to be expressed, a pattern forming material having different texture and color from the steel plate and filled in the pattern forming groove, and a decal unit decalled on the surface of the pattern forming material; and the method for manufacturing the ornamental steel plate includes coating an etching resist ink on the surface of the steel plate except for a pattern to be expressed, drying and heating the etching resist ink, forming the pattern forming groove by etching the pattern by spraying an etching solution on the surface of the steel plate, removing the etching resist ink by spraying an etching resist ink remover on the surface of the steel plate, filling the pattern forming material having different texture and color from the steel plate in the pattern forming groove, removing a protruding portion of the pattern forming material on the steel plate and polishing the surface of the steel plate at the same time, and decalling colors and patterns of a decal paper on the surface of the pattern forming material by fixing and heat-compressing the decal paper thereon.

23 Claims, 6 Drawing Sheets

ORNAMENTAL STEEL AND MANUFACTURING METHOD THEREFOR

BACKGROUND OF THE INVENTION

1. Field of the Invention

The present invention is directed to an ornamental steel plate for decorating an outer or inner wall of a building, and in particular to an ornamental steel plate manufactured by three-dimensionally forming a pattern, picture, figure, or letter which has various textures and colors (hereinafter, referred as "pattern") on a steel plate, and a manufacturing method therefor.

2. Description of the Background Art

In general, a stainless steel plate is mostly employed as an ornamental steel plate used for a wall in a building or for an inner or outer wall of an elevator. A pattern is simply formed thereon by polishing or etching.

However, on the conventional ornamental steel plate, a background and a pattern are formed of the same nature, thus limitedly improving an aesthetic sense and making viewers easily bored with it.

Especially, an elevator is such a narrow space that viewers tend to watch its wall or door. When the wall or door of the elevator is made of the conventional polished or etched steel plate, it may not aesthetically satisfy the viewers. Further, the viewers may be easily bored with a simple and common pattern.

SUMMARY OF THE INVENTION

It is therefore a primary object of the present invention to provide an ornamental steel plate capable of satisfying aesthetic desire of viewers by forming various and beautiful ornaments thereon by using a pattern or picture with different texture and color from a background, and a manufacturing method therefor.

It is another object of the present invention to provide an ornamental steel plate having more various and beautiful patterns by dividing a pattern into various components and forming various patterns of different textures and colors on each component, and by decalling colors and patterns of a decal paper to the components at the same time, and a manufacturing method therefor.

In order to achieve the above-described objects of the present invention, there is provided an ornamental steel plate including: a steel plate, a pattern forming groove being formed on the surface of which according to a pattern to be expressed; and a pattern forming material having different texture and color from the steel plate and filled in the pattern forming groove. The ornamental steel plate may further include a decal unit decalled on the surface of the pattern forming material.

In addition, in order to achieve the above-described objects of the present invention, there is provided a method for manufacturing the ornamental steel plate, including the steps of: coating an etching resist ink on the surface of the steel plate except for the pattern to be expressed; drying and heating the etching resist ink; forming the pattern forming groove by etching the pattern by spraying an etching solution on the surface of the steel plate; removing the etching resist ink by spraying an etching resist ink remover on the surface of the steel plate; filling the pattern forming material having different texture and color from the steel plate in the pattern forming groove; and removing a protruding portion of the pattern forming material on the steel plate and polishing the surface of the steel plate at the same time. The method for manufacturing the ornamental steel plate may further include a step of decalling colors and patterns on the decal paper on the surface of the polished pattern forming material by fixing and heat-compressing the decal paper thereon.

BRIEF DESCRIPTION OF THE DRAWINGS

The present invention will become better understood with reference to the accompanying drawings which are given only by way of illustration and thus are not limitative of the present invention, wherein:

FIGS. 4A to 4F are all process views for explaining a method for manufacturing the ornamental steel plate according to the first embodiment of the present invention, wherein:

FIG. 4A illustrates a step of coating an etching resist ink;

FIG. 4B illustrates a step of drying the etching resist ink;

FIG. 4C illustrates a step of etching;

FIG. 4D illustrates a step of removing the etching resist ink;

FIG. 4E illustrates a step of filling a pattern forming material; and

FIG. 4F illustrates a step of polishing a surface;

FIGS. 8A and 8B are process views for explaining a method for manufacturing the ornamental steel plate according to the second embodiment of the present invention, following the process view in FIG. 4F, wherein:

FIG. 8A illustrates a step of decalling; and

FIG. 8B illustrates a step of stripping a decal paper.

DETAILED DESCRIPTION OF THE INVENTION

An ornamental steel plate and a manufacturing method therefor according to a first embodiment of the present invention will now be described with reference to the accompanying drawings.

Figure 1:
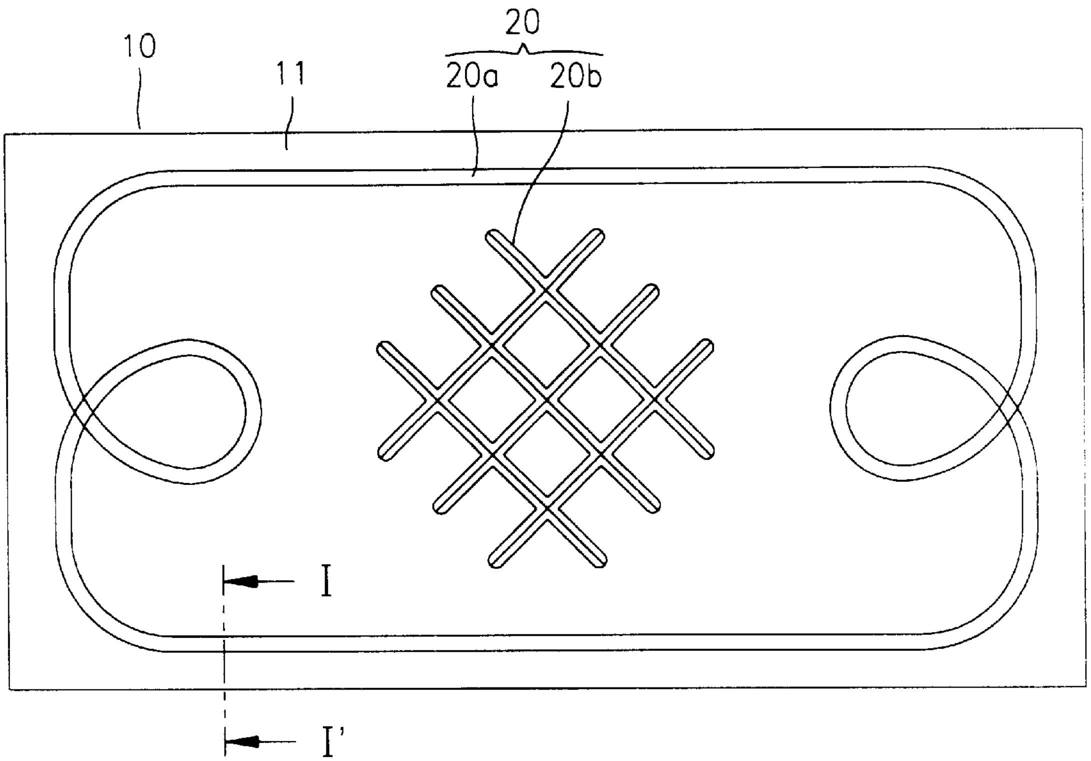
FIG. 1 is a front view of an ornamental steel plate according to a first embodiment of the present invention.
Figure 2:
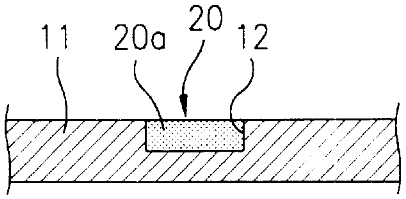
FIG. 2 is an enlarged cross-sectional view of the ornamental steel plate taken along line I~I' in FIG. 1.

FIGS. 1 and 2 illustrate the ornamental steel plate according to the first embodiment of the present invention. FIG. 1 is a front view and FIG. 2 is an enlarged cross-sectional view taken along line I~I' in FIG. 1.

As depicted in FIGS. 1 and 2, reference numeral 10 is the ornamental steel plate according to the present invention, and reference numeral 11 is a steel plate which is commonly used for decorating an inner or outer wall of a building.

A pattern forming groove 12 with a predetermined pattern is formed on the steel plate 11 by etching. A pattern forming material 20 with different texture and color from the steel plate 11 is filled in the pattern forming groove 12. Thus, a pattern having texture and color of the pattern forming material 20 is expressed on a background having texture and color of the steel plate 11.

Here, the "pattern" includes pictures, figures or letters.

A stainless steel plate is mostly used as the steel plate 11, and a copper plate may be employed.

In the case of a normally etched steel plate, etching is carried out at a depth of approximately 30 μm. However, according to the present invention, the pattern forming groove 12 is etched at a depth between 400 μm and 600 μm, thereby preventing the pattern forming material 20 from being separated even when an external force is applied thereto.

A single material may be filled in the entire pattern forming groove 12 as the pattern forming material 20 in order to form one kind of texture and color. However, any kind of material can be employed if the material has different texture and color from the steel plate 11.

Figure 3:
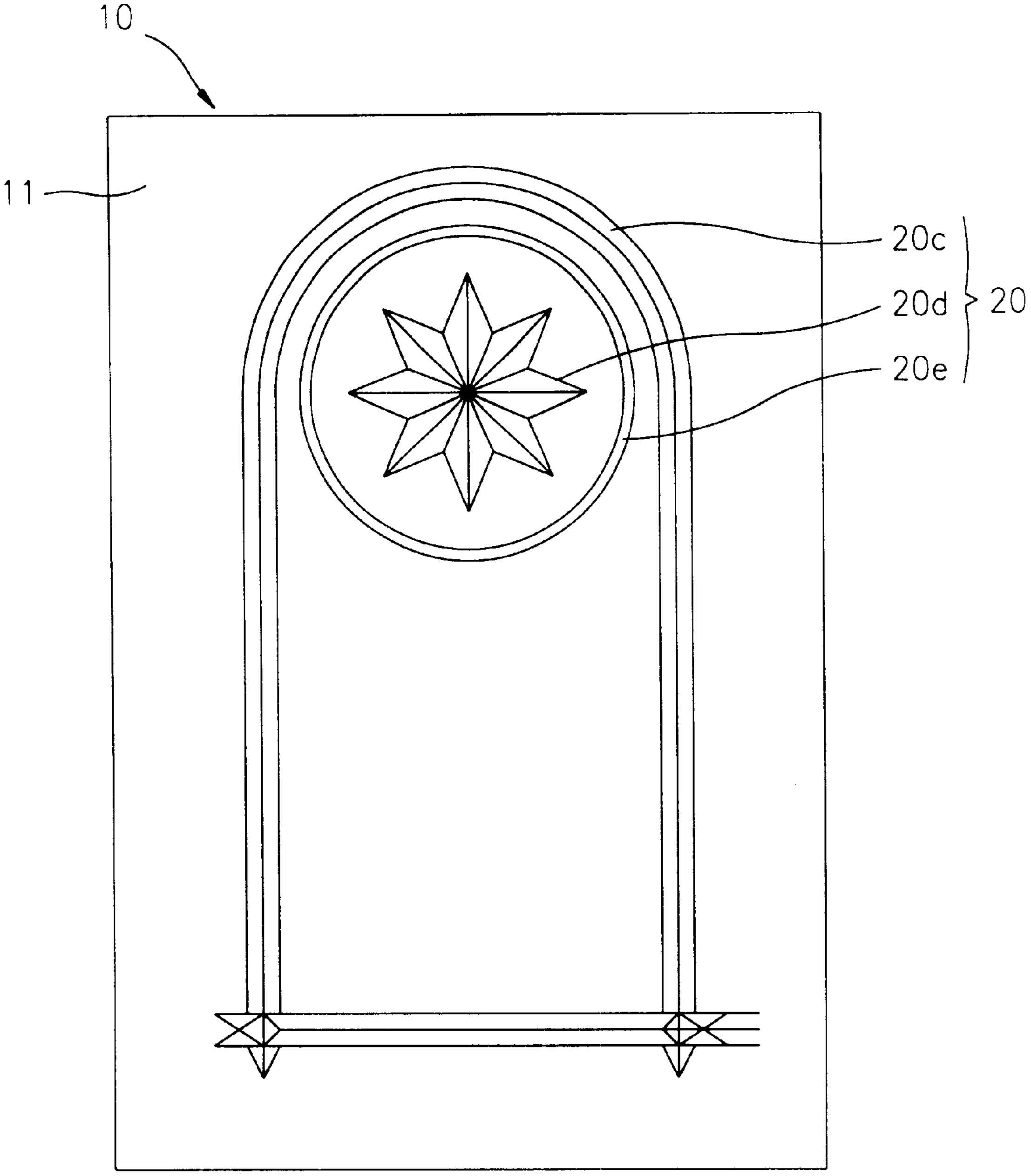
FIG. 3 is a front view of another ornamental steel plate according to the first embodiment of the present invention.

For example, as illustrated in FIGS. 1 to 3, different kinds of pattern forming materials 20 may be filled in the pattern forming groove 12 divided into several portions. Here, a synthetic resin or a mixture of the synthetic resin and metal powder or stone powder may be used as the pattern forming material 20. A pigment may be further mixed thereto.

As illustrated in FIG. 1, when the pattern forming material 20*a* consists merely of the synthetic resin, the pattern forming material 20*b* may consist of a mixture of the synthetic resin and metal powder.

As shown in FIG. 3, when the pattern forming material 20*c* consists of a pearl pigment which will be discussed later, the pattern forming material 20*b* may include a mixture of the synthetic resin and stone powder, and the pattern forming material 20*c* may include a mixture of the synthetic resin and gold powder.

A more beautiful pattern can be obtained by using various kinds of pattern forming materials 20.

On the other hand, the pearl pigment obtained by mixing a pearl material obtained from a mica into the pigment is employed as a pigment.

A material which is relatively hard when hardened, for example, an epoxy resin, is preferably used as the synthetic resin.

A high temperature hardening and drying type epoxy resin such as amino resin, phenolic resin and ester resin, or a normal temperature hardening and drying type epoxy resin such as amine resin may be employed.

A hardener is added into the epoxy resin by 3 to 5%. The epoxy resin is dried at a temperature between 120° C. and 170° C. for about 20 minutes, and changed to resin particles which can be hardened. It takes a remarkably long time to harden a first liquid type epoxy resin, It is thus preferable to use a second type epoxy resin which is hardened in a short time.

The method for manufacturing the ornamental steel plate according to the present invention will now be explained with reference to FIGS. 4A through 4F.

FIGS. 4A to 4F are process views illustrating each step of the method for manufacturing the ornamental steel plate according to the present invention.

1) Step of Coating Etching Resist Ink

Figure 4A:
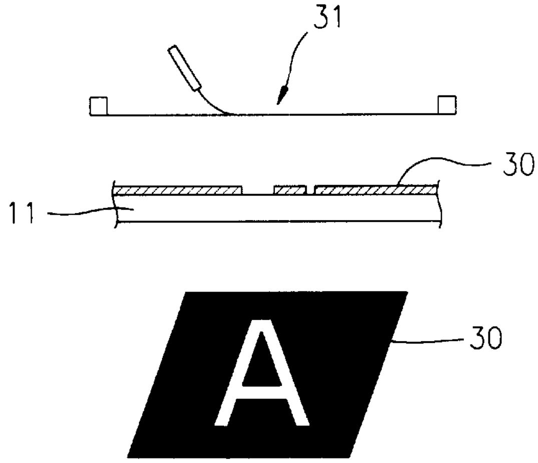

As illustrated in FIG. 4A, the etching resist ink 30 is coated on the surface of the steel plate 11 except for a pattern portion to be expressed by a silk printing method using a silk printer 31.

Here, the etching resist ink 30 is an acid proof ink. DA 180C(black) and DA 380B(blue) manufactured by the Korean Special Ink Co. may be employed. DA 180C is dried at the temperature of 80° C. for about 3 minutes when coated at a thickness between 20 μm and 25 μm. DA 380B is dried at the same temperature for about 5 minutes when coated at a thickness of 20 μm and 25 μm.

When the etching resist ink 30 is coated on the surface of the steel plate 11, the portion which is not coated is the pattern to be expressed.

2) Step of Drying Etching Resist Ink

Figure 4B:
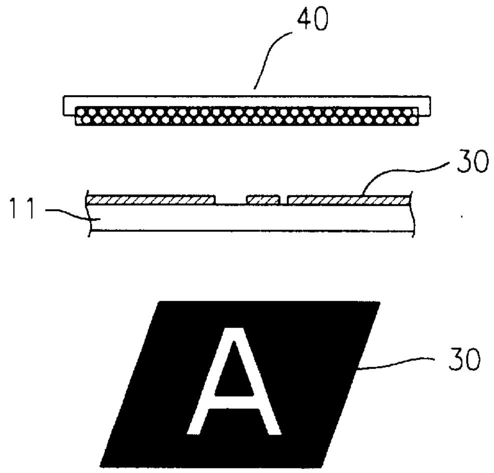

As illustrated in FIG. 4B, the etching resist ink 30 is sufficiently dried by heating the steel plate 11 on which the etching resist ink 30 is coated with a heater 40.

Here, a heating temperature is set between 120° C. and 180° C. and a heating time is set between 20 and 40 hours.

It is preferable to use an infrared ray heater as the heater 40, but it is not limitative.

3) Step of Etching

Figure 4C:
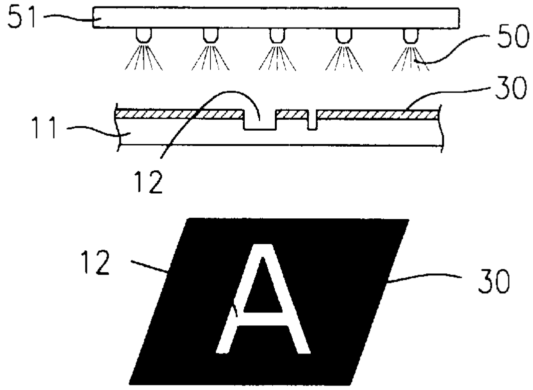

As shown in FIG. 4C, the portion which is not coated with the etching resist ink 30, namely the pattern portion is etched by spraying an etching solution 50 on the steel plate which is coated and dried with the etching resist ink.

In this step, etching is carried out relatively deep at a depth between 400 μm and 600 μm.

Considering the etching is generally performed at a depth of 30 μm in order to form a pattern on a conventional steel plate, the depth of etching is remarkably deep in the present invention.

Here, in case the steel material 11 is a stainless steel plate, an $FeCI_3$ solution is used as the etching solution 50.

The $FeCI_3$ solution of 37 to 44% is preferably employed. An activation temperature of $FeCI_3$ is over 30° C. When a temperature rises by 10° C., its corrosion performance is increased two times. The $FeCI_3$ solution is used by suitably controlling such property.

A continuous etching device 61 is commonly used to spray the etching solution 50. A spraying pressure is preferably set between 1.0 kg/cm$^2$ and 2.5 kg/cm$^2$.

4) Step of Removing Etching Resist Ink

Figure 4D:
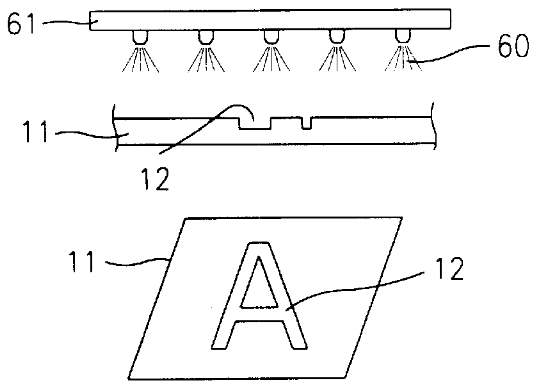

As illustrated in FIG. 4D, the etching resist ink 30 is removed by spraying an etching resist ink remover 60 on the steel plate 11 with the etching device 61, thereby exposing the surface of the steel plate 11 on which the pattern forming groove 12 is formed.

An NaOH aqueous solution of 5% is used as the etching resist ink remover 60.

The etching resist ink 30 is removed by a chemical reaction between the etching resist ink 30 and etching resist ink remover 60.

When coated at a thickness between 20 μm and 25 μm, the etching resist ink 30 is removed by spraying the NaOH aqueous solution for 1 to 2 minutes as the etching resist ink remover 60.

5) Step of Filling Pattern Forming Material

Figure 4E:
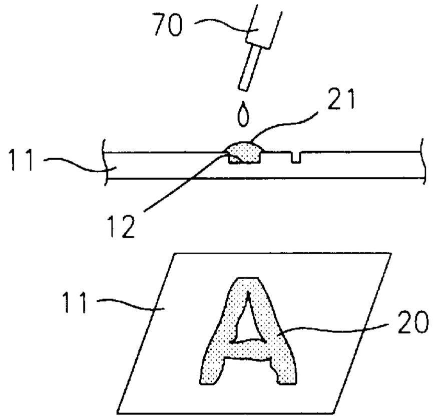

As illustrated in FIG. 4E, the pattern forming material 20 is filled in the pattern forming groove 12 on the surface of the steel plate 11 by using a filling device 70.

The pattern forming material 20 is filled over the surface of the steel plate 11 in order for an empty space not to be formed.

In case the first liquid type epoxy resin is employed as the pattern forming material 20, it takes a longer time to harden. The hardening time can be reduced by using the second liquid type epoxy resin.

In the case of the second liquid type epoxy resin, the hardener is added into the epoxy resin by 3% to 5%. The epoxy resin is then heated at a temperature between 120° C. and 170° C., and thus hardened within 30 minutes. When the metal powder or stone powder is mixed to the second liquid type epoxy resin, the hardening time may be lightly longer.

However, the second liquid type epoxy resin is usually hardened within 30 minutes.

6) Step of Polishing Surface

Figure 4F:
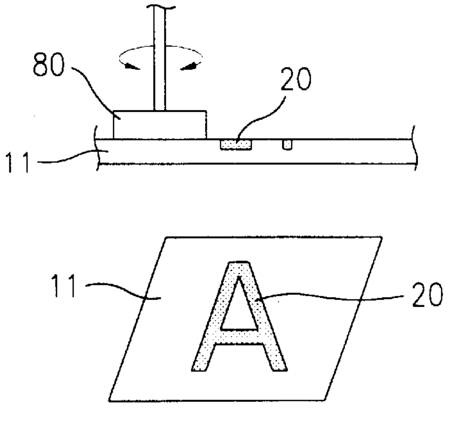

As depicted in FIG. 4F, a protruding portion 21 of the pattern forming material 20 on the surface of the steel plate 11 is polished and removed by a whetstone 80.

In this step, only the protruding portion 21 of the pattern forming material 20 may be polished. However, the surface of the steel plate 11 may be scratched while the protruding portion 21 is polished. Therefore, the protruding portion 21 of the pattern forming material 20 is removed, and at the same time the surface of the steel plate 11 is polished, thereby obtaining a steel plate of good quality.

Not a grinding method using an outer circumferential surface of the whetstone 80 but a lapping method using its plane is employed as a polishing method.

A soft whetstone is used during the polishing process, instead of a hard whetstone such as a grinding stone. Removing the protruding portion 21 of the pattern forming material 20 and polishing the steel plate 11 are efficiently carried out by using a coarse whetstone at an initial stage and gradually changing the coarse one to a less coarse one.

The whetstones are formed of an iron oxide and other abrasive materials. A polishing solution of a nitric acid group is added during the polishing step, and the surface of the steel plate 11 is polished by using an wool felt.

As a result, the ornamental steel plate with superior texture and color is obtained by the above-described steps.

Figure 5:
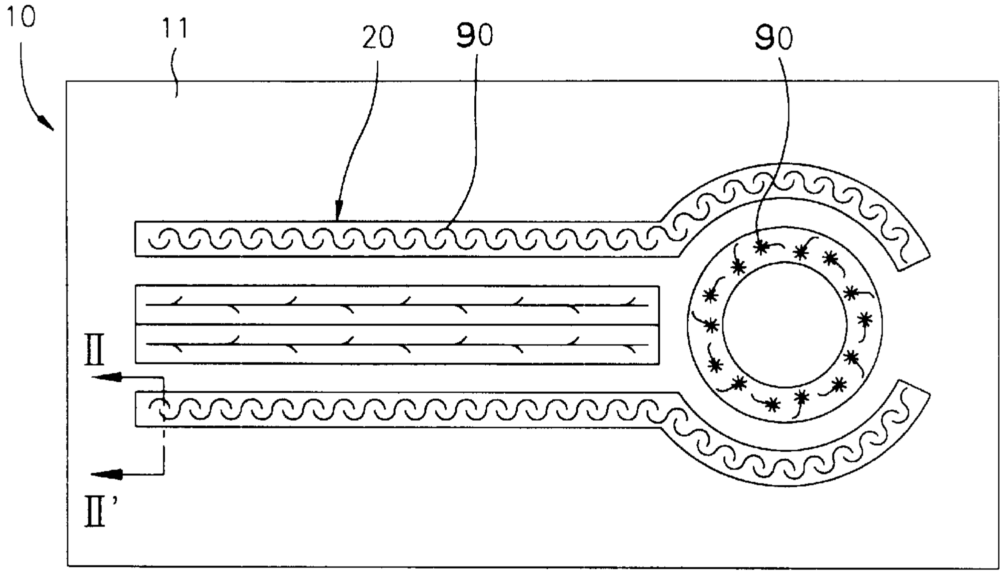
FIG. 5 is a front view of an ornamental steel plate according to a second embodiment of the present invention.
Figure 6:
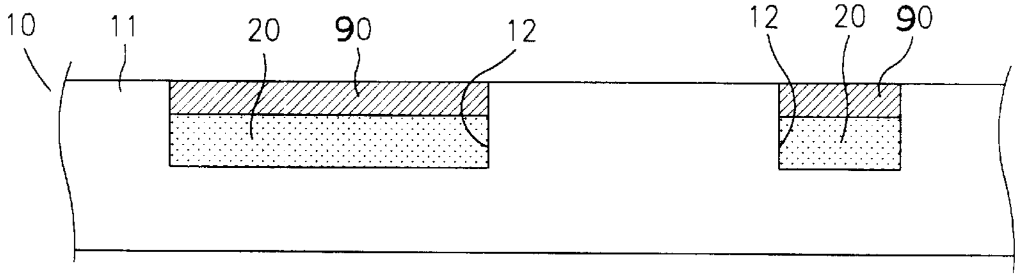
FIG. 6 is an enlarged cross-sectional view of the ornamental steel plate taken along line II~II' in FIG. 5.

FIGS. 5 and 6 illustrate an ornamental steel plate according to a second embodiment of the present invention. FIG. 5 is a front view and FIG. 6 is an enlarged cross-sectional view taken along line II~II' in FIG. 5.

According to the second embodiment of the present invention, a decal unit 90 is decalled on the surface of the pattern forming material 20 of the steel plate 11 which is polished, as shown in FIG. 4F, thereby expressing a pattern with various textures and colors.

That is, a pattern having the texture and color of the decal unit 90 decalled on the pattern forming material 20 is expressed on the background having the texture and color of the steel plate 11.

Figure 7:
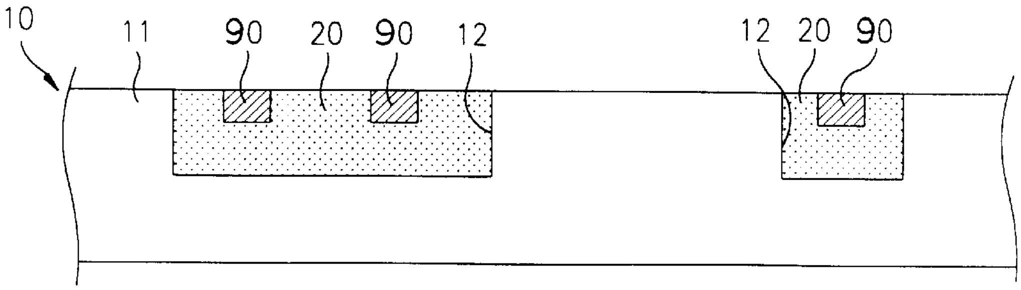
FIG. 7 is an enlarged cross-sectional view of another ornamental steel plate according to the second embodiment of the present invention taken along line II~II' in FIG. 5.

The decal unit 90 is decalled on the pattern forming material 20 by a conventional decal method. As illustrated in FIGS. 6 and 7, the decal unit 90 may be decalled on the entire surface of the pattern forming material 20, or may be partially decalled thereon.

The textures and colors of the pattern forming material 20 and decal unit 90 are simultaneously expressed by decalling the decal unit 90 on the entire or partial surface of the pattern forming material 20.

The method for manufacturing the ornamental steel plate according to the second embodiment of the present invention will now be described with reference to FIGS. 8A and 8B.

The step of coating the etching resist ink through the step of polishing the surface are identical to the first embodiment of the present invention, and thus will not be described here.

7) Step of Decalling

Figure 8A:
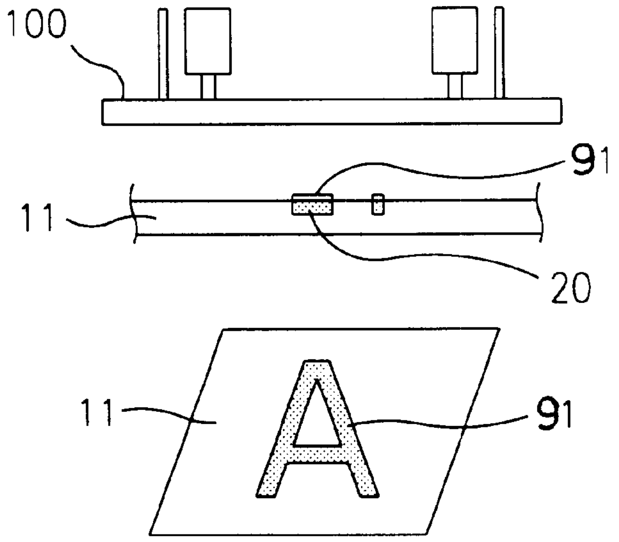
Figure 8B:
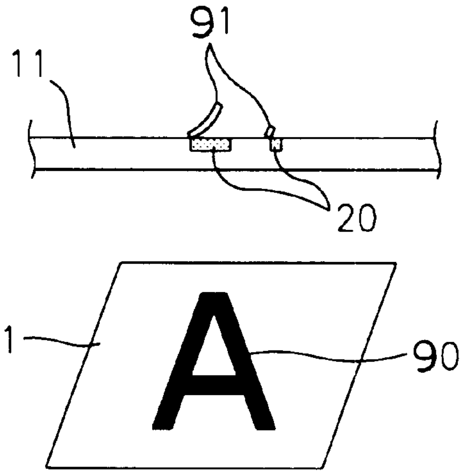

As illustrated in FIG. 8A, a decal paper 91 is fixed, heated and compressed on the surface of the pattern forming material 20, and thus the textures and colors of the decal paper 91 are decalled on the pattern forming material 20.

Here, the decal unit 91 is heated and compressed at a temperature between 100° C. and 150° C. under a pressure between 1.5 kg/cm$^2$ and 2.5 kg/cm$^2$ for 5 to 10 minutes.

When decalling is completely finished, the decal paper 91 is stripped. The colors and patterns of the decal paper 91 are expressed on the pattern forming material 20.

As discussed earlier, the ornamental steel plate of the present invention has various textures and colors, thereby providing an improved aesthetic sense. Thus, the viewers will not be bored with the ornamental steel plate.

In addition, more various and beautiful patterns are created by decalling the colors and patterns of the decal paper on the surface of the pattern forming material.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An ornamental steel plate comprising:

a steel plate having formed below the surface thereof a pattern forming groove according to a pattern to be expressed;

a pattern forming material having different texture and color from the steel plate and filling in the pattern forming groove to a level substantially coplanar with the surface of the steel plate; and a decal unit which is decalled on the surface of the pattern forming material, whereby a pattern having different texture and color from the steel plate is expressed.

2. An ornamental steel plate according to claim 1, wherein a depth of the pattern forming groove is between 400 $\mu$m and 600 $\mu$m.

3. An ornamental steel plate according to claim 1, wherein the decal unit is decalled on the entire surface of the pattern forming material.

4. An ornamental steel plate according to claim 1, wherein the decal unit is partially decalled on the surface of the pattern forming material.

5. An ornamental steel plate according to claim 1, wherein the pattern forming material filled in the pattern forming groove has a single texture and a single color.

6. An ornamental steel plate according to claim 1, wherein the pattern forming material filled in the pattern forming groove has various textures and colors according to a pattern.

7. An ornamental steel plate according to claim 1, wherein the pattern forming material is a synthetic resin.

8. An ornamental steel plate according to claim 7, wherein the synthetic resin is an epoxy resin.

9. An ornamental steel plate according to claim 8, wherein the epoxy resin is heat-treated for fast hardening by adding hardener thereto.

10. An ornamental steel plate according to claim 1, wherein the pattern forming material consists of a mixture of the synthetic resin, metal powder and stone powder.

11. An ornamental steel plate according to claim 10, wherein the pattern forming material consists of a mixture of the synthetic resin and the metal powder or a mixture of the synthetic resin and the stone powder.

12. An ornamental steel plate according to claim 10, wherein a pearl material is used as the pattern forming material instead of the synthetic resin.

13. An ornamental steel plate comprising:

a steel plate having formed below the surface thereof a pattern forming groove according to a pattern to be expressed; and a pattern forming material having different texture and color from the steel plate and having various textures and colors according to a pattern, and filling in the pattern forming groove to a level substantially coplanar with the surface of the steel plate, whereby a pattern having different texture and color from the steel plate is expressed.

14. An ornamental steel plate according to claim 13, wherein a depth of the pattern forming groove is between 400 μm and 600 μm.

15. An ornamental steel plate according to claim 13, further comprising a decal unit which is decalled on the surface of the pattern forming material.

16. An ornamental steel plate according to claim 15, wherein the decal unit is decalled on the entire surface of the pattern forming material.

17. An ornamental steel plate according to claim 15, wherein the decal unit is partially decalled on the surface of the pattern forming material.

18. An ornamental steel plate according to claim 13, wherein the pattern forming material is a synthetic resin.

19. An ornamental steel plate according to claim 18, wherein the synthetic resin is an epoxy resin.

20. An ornamental steel plate according to claim 19, wherein the epoxy resin is heat-treated for fast hardening by adding hardener thereto.

21. An ornamental steel plate according to claim 13, wherein the pattern forming material consists of a mixture of the synthetic resin, metal powder, and stone powder.

22. An ornamental steel plate according to claim 21, wherein the pattern forming material consists of a mixture of the synthetic resin and the metal powder or a mixture of the synthetic resin and the stone powder.

23. An ornamental steel plate according to claim 21, wherein a pearl material is used as the pattern forming material instead of the synthetic resin.

* * * * *